United States Patent
Sagi et al.

(10) Patent No.: US 11,270,163 B2
(45) Date of Patent: Mar. 8, 2022

(54) LEARNING DEVICE, LEARNING METHOD, AND STORAGE MEDIUM

(71) Applicant: NEC Corporation, Tokyo (JP)

(72) Inventors: Kazutoshi Sagi, Tokyo (JP); Takahiro Toizumi, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 73 days.

(21) Appl. No.: 16/772,035

(22) PCT Filed: Dec. 14, 2017

(86) PCT No.: PCT/JP2017/044894
§ 371 (c)(1),
(2) Date: Jun. 11, 2020

(87) PCT Pub. No.: WO2019/116494
PCT Pub. Date: Jun. 20, 2019

(65) Prior Publication Data
US 2021/0081721 A1 Mar. 18, 2021

(51) Int. Cl.
*G06K 9/62* (2006.01)
*G06K 9/46* (2006.01)

(52) U.S. Cl.
CPC ............ *G06K 9/6262* (2013.01); *G06K 9/46* (2013.01); *G06K 9/6267* (2013.01)

(58) Field of Classification Search
CPC ....... G06K 9/6262; G06K 9/46; G06K 9/6267
See application file for complete search history.

(56) References Cited

U.S. PATENT DOCUMENTS

| 10,719,706 B1 * | 7/2020 | Nicotera | G06K 9/0063 |
| 2006/0039600 A1 * | 2/2006 | Solem | G06K 9/00281 |
| | | | 382/154 |

(Continued)

FOREIGN PATENT DOCUMENTS

| JP | 07-121713 A | 5/1995 |
| JP | 11-015973 A | 1/1999 |

(Continued)

OTHER PUBLICATIONS

Yuta Ashihara, et al., "Middle layers shareing for transfer learning to predict rotating image in DeepLearning", IPSJ SIG Technical Report, Intelligent Computing Systems (ICS), Feb. 24, 2016, pp. 1-8, vol. 2016-ICS-182, No. 1, Internet: <URL:https://ipsj.ixsq.nii.ac.jp/ej/?action=repository_uri&item_id=157634&file_id=1&file_no=1>.

(Continued)

*Primary Examiner* — Utpal D Shah
(74) *Attorney, Agent, or Firm* — Sughrue Mion, PLLC

(57) ABSTRACT

A learning device comprises: an acquisition unit that acquires a first feature amount derived by an encoder from data with an identification object recorded therein, the encoder being configured so as to derive, from data with the identical object in various forms recorded therein, feature amounts which are mutually convertible by a conversion using a conversion parameter that takes a value according to the difference in the forms; a conversion unit that generates a second feature amount by performing a conversion on the first feature amount using the conversion parameter value; and a parameter updating unit that updates the value of a sorting parameter used in sorting by a sorting means, which is configured to sort second feature amounts as input, such that if the second feature amount has been input, the sorting (Continued)

means outputs a result indicating, as a sorting destination, a class associated with the identification object.

17 Claims, 11 Drawing Sheets

(56) References Cited

U.S. PATENT DOCUMENTS

| | | | |
|---|---|---|---|
| 2012/0328203 A1 | 12/2012 | Medasani et al. | |
| 2013/0094733 A1 | 4/2013 | Nosato et al. | |
| 2015/0112182 A1* | 4/2015 | Sharma | A61B 5/7264 600/408 |
| 2019/0347526 A1* | 11/2019 | Sunkavalli | G06K 9/46 |
| 2021/0295167 A1* | 9/2021 | Hill | G06F 30/23 |

FOREIGN PATENT DOCUMENTS

| | | |
|---|---|---|
| JP | 2004-62719 A | 2/2004 |
| JP | 2013-008364 A | 1/2013 |
| JP | 2016-197389 A | 11/2016 |

OTHER PUBLICATIONS

International Search Report for PCT/JP2017/044894 dated Feb. 13, 2018 (PCT/ISA/210).
Written Opinion for PCT/JP2017/044894 dated Feb. 13, 2018 (PCT/ISA/237).
Extended European Search Report for EP Application No. EP17934746.3 dated Nov. 24, 2020.
Girdhar Rohit et al: "Learning a Predictable and Generative Vector Representation for Objects", Sep. 17, 2016 (Sep. 17, 2016), 12th European Conference on Computer Vision, ECCV 2012; [Lecture Notes in Computer Science], Springer Berlin Heidelberg, Berlin Germany, pp. 484-499, XP047565732, ISSN: 0302-9743, ISBN: 978-3-642-04427-4, [retrieved on Sep. 17, 2016].
Japanese Office Action for JP Application No. 2019-559490 dated Nov. 2, 2021 with English Translation.

* cited by examiner

Fig. 3

$$S_k = \begin{bmatrix} 0 & \cdots & 0 & 1 & & & 0 \\ \vdots & \ddots & \vdots & & \ddots & & \\ 0 & \cdots & 0 & 0 & & & 1 \\ 1 & & 0 & 0 & \cdots & & 0 \\ & \ddots & & \vdots & \ddots & & \vdots \\ 0 & & 1 & 0 & \cdots & & 0 \end{bmatrix}$$

kr COLUMNS | n−kr COLUMNS n−kr ROWS kr ROWS

LEARNING DEVICE, LEARNING METHOD, AND STORAGE MEDIUM

CROSS REFERENCE TO RELATED APPLICATIONS

This application is a National Stage of International Application No. PCT/JP2017/044894 filed Dec. 14, 2017, the disclosure of which is incorporated herein in its entirety by reference.

TECHNICAL FIELD

The present disclosure relates to a technology of learning performed by a computer.

BACKGROUND ART

In construction of a classifier performing classification of a target indicated in data, use of a variable well representing a feature of the target leads to improvement of precision of classification. As a method of deriving a variable well representing a feature of a target from input data, a method of using an autoencoder is well known.

A typical autoencoder includes an input layer, an intermediate layer, and an output layer. The typical autoencoder determines optimum values of a weight and a bias used for encoding (that is, conversion from data in the input layer to data in the intermediate layer), and a weight and a bias used for decoding (that is, conversion from data in the intermediate layer to data in the output layer), based on a comparison between data input to the input layer and data output from the output layer.

Data output in the intermediate layer by encoding using the weight and the bias determined as a result of learning by the autoencoder can be considered information well representing a feature of a target. The data output in the intermediate layer are generally referred to as a "feature value vector," a "feature vector," or simply a "feature value" or a "feature." The data output in the intermediate layer are herein also referred to as a "set of latent variable values" or a "latent variable vector."

PTL 1 is a literature describing a technology related to the present invention. PTL 1 discloses an image processing device converting (in another word, normalizing) a size, a rotation angle, a position, and/or the like of a target in an image to a state suitable for identification. Magnitude of the conversion for normalization is determined by a coefficient determined based on a relation between a vector (mapping vector) in a case of mapping data of a coarse-grained image onto a space F by nonlinear transformation and a subspace including a basis vector representing a feature of a learning sample. PTL 1 describes that when an autoencoder is used in the technology, an output of the output layer of the autoencoder corresponds to a mapping by the aforementioned nonlinear transformation, and an output of the intermediate layer corresponds to a projection of the mapping vector on the subspace.

CITATION LIST

Patent Literature

PTL 1: Japanese Unexamined Patent Application Publication No. 2004-62719

SUMMARY OF INVENTION

Technical Problem

A feature value vector derived by a neural network optimized by a common autoencoder is not necessarily represented in such a way that different forms taken by the same target interrelate with each other. Then, for example, it is assumed that, by use of a feature value vector derived by a neural network optimized by a common autoencoder, a classifier for classifying a chair appearing in an image as a chair is generated by learning using only images of the chair photographed in a direction indicated by FIG. 1A as training data. In such a case, the generated classifier may not be able to identify a chair photographed in a direction indicated by FIG. 1B or from an angle indicated by FIG. 1C as a chair. The reason is that feature value vectors unrelated to each other may be derived from data recorded in forms (a direction and an angle in the example described above) different from each other even when the data are related to the same target.

In order to correctly identify a target object that may take various forms, use of training data completely covering the various forms in learning by a classifier is generally required. However, preparation of training data completely covering the various forms is not necessarily easy.

The technology described in PTL 1 is a technology of improving identification performance on a target that may take various forms, by normalizing an image. However, a function for performing the normalization needs to be derived by learning having images in which various forms of a target appear as training data. A pattern identification unit 100 identifying a target takes a normalized image as an identification target and therefore does not guarantee correct identification of a target taking a form not included in the training data.

An object of the present invention is to provide a learning device capable of generating an identifier capable of identifying a target in various forms even when the number of samples of data in which the target is recorded is small.

Solution to Problem

A learning device according to an aspect of the present invention includes: an acquisition means for acquiring a first feature value derived, by an encoder, from data in which an identification target is recorded, the encoder being configured to derive interconvertible feature values from data in which different forms of the same target are respectively recorded, by a conversion using a conversion parameter taking a value based on the difference between the forms; a conversion means for generating a second feature value by performing a conversion using a value of the conversion parameter on the first feature value; and a parameter updating means for updating a value of a classification parameter used in classification by a classification means configured to perform classification with a feature value as an input, in such a way that the classification means outputs a result indicating a class associated with the identification target as a classification when the second feature value is determined as an input.

A learning method according to an aspect of the present invention includes: acquiring a first feature value derived, by an encoder, from data in which an identification target is recorded, the encoder being configured to derive interconvertible feature values from data in which different forms of the same target are respectively recorded, by a conversion using a conversion parameter taking a value based on the difference between the forms; generating a second feature value by performing a conversion using a value of the conversion parameter on the first feature value; and updating a value of a classification parameter used in classification by a classification means configured to perform classification with a feature value as an input, in such a way that the classification means outputs a result indicating a class associated with the identification target as a classification when the second feature value is determined as an input.

A storage medium according to an aspect of the present invention stores a program causing a computer to execute: acquisition processing of acquiring a first feature value derived, by an encoder, from data in which an identification target is recorded, the encoder being configured to derive interconvertible feature values from data in which different forms of the same target are respectively recorded, by a conversion using a conversion parameter taking a value based on a difference between the forms; conversion processing of generating a second feature value by performing a conversion using a value of the conversion parameter on the first feature value; and parameter updating processing of updating a value of a classification parameter used in classification by a classification means configured to perform classification with a feature value as an input, in such a way that the classification means outputs a result indicating a class associated with the identification target as a classification when the second feature value is determined as an input. For example, the aforementioned storage medium is a computer-readable, non-transitory storage medium.

Advantageous Effects of Invention

The present invention can generate an identifier capable of identifying a target in various forms even when the number of samples of data in which the target is recorded is small.

BRIEF DESCRIPTION OF DRAWINGS

FIG. 3 is a diagram illustrating an example of a matrix used in a variable conversion.

EXAMPLE EMBODIMENT

Example embodiments of the present invention will be described in detail below referring to drawings.

First Example Embodiment

Figure 2:
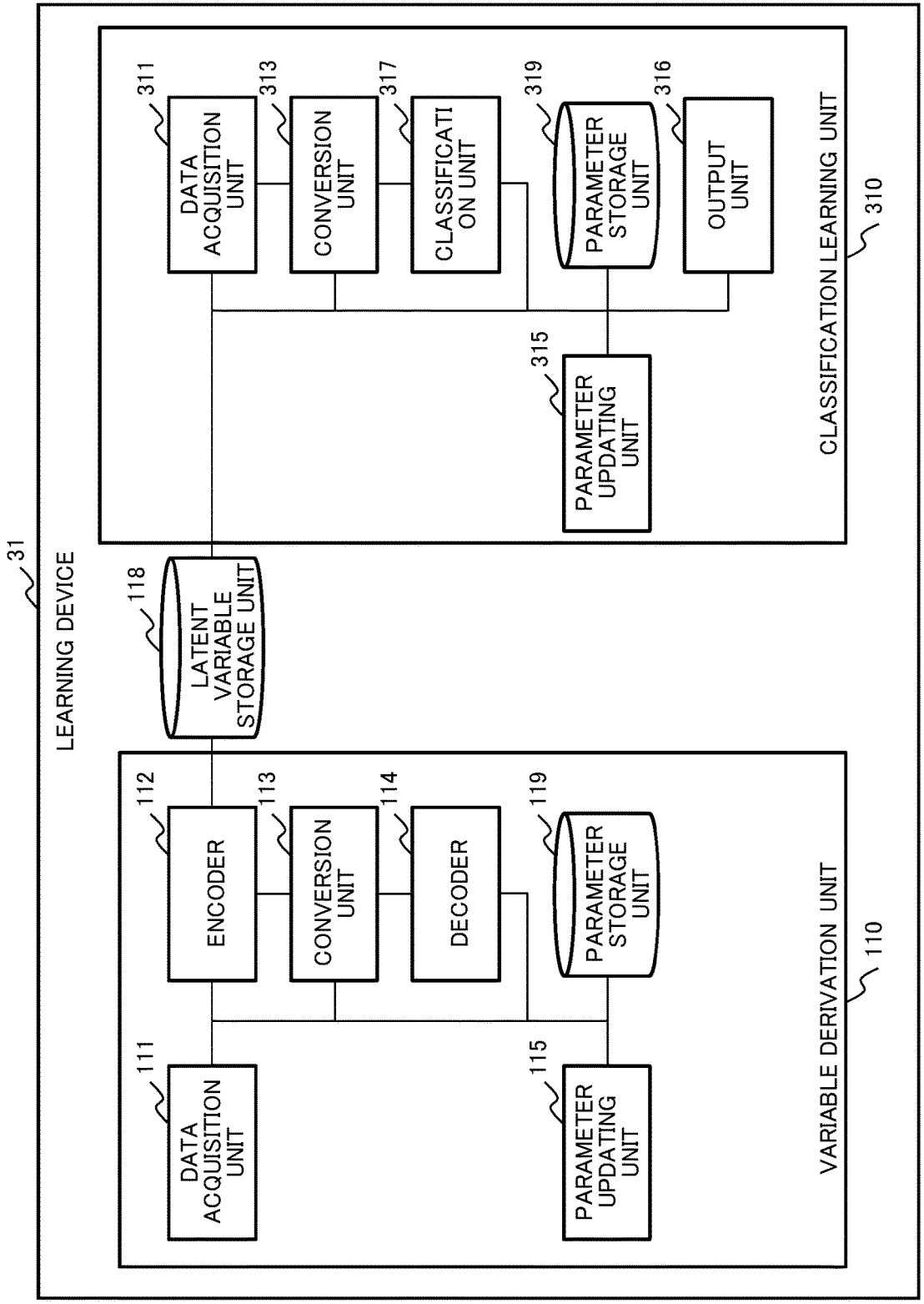
FIG. 2 is a block diagram illustrating a configuration of a learning device according to a first example embodiment of the present invention.

First, a first example embodiment of the present invention will be described. FIG. 2 is a block diagram illustrating a configuration of a learning device 31 according to the first example embodiment.

The learning device 31 performs two types of learning being variable derivation learning and classification learning. A unit related to the variable derivation learning is herein referred to as a variable derivation unit 110, and a unit performing the classification learning is referred to as a classification learning unit 310.

First, a configuration and an operation of the variable derivation unit 110 will be described below.

Variable Derivation Unit 110

Configuration

The variable derivation unit 110 includes a data acquisition unit 111, an encoder 112, a conversion unit 113, a decoder 114, a parameter updating unit 115, and a parameter storage unit 119.

For example, the data acquisition unit 111, the encoder 112, the conversion unit 113, the decoder 114, and the parameter updating unit 115 are provided by one or a plurality of central processing units (CPUs) executing a program.

For example, the parameter storage unit 119 is a memory. The parameter storage unit 119 may be an auxiliary storage device such as a hard disk. According to another example embodiment, the parameter storage unit 119 may be configured to be external to the learning device 31 and be communicable with the learning device 31 in a wired or wireless manner. The parameter storage unit 119 stores parameters used in a conversion performed by the encoder 112 and parameters used in a conversion performed by the decoder 114.

The variable derivation unit 110 may include a storage device transitorily or non-transitorily storing data, aside from the parameter storage unit 119.

Data Acquisition Unit 111

The data acquisition unit 111 acquires data used by the variable derivation unit 110. Data used by the variable derivation unit 110 are input data, correct answer data, and difference information indicating a relation between the input data and the correct answer data.

Input data are data in which a target of learning by the variable derivation unit 110 is recorded. For ease of understanding, an optical image is assumed as an example of input data in the description of the present example embodiment. Examples of input data other than an optical image will be described in the item "Supplement."

When input data represent an optical image, the input data represent an image in which a target (for example, an object and a person) appears. For example, input data represent a vector having a pixel value of each pixel of an image as a component. When a gray-scale image having 28 pixels in a longitudinal direction and 28 pixels in a lateral direction is assumed as input data, the number of components of the input data is 28×28=784.

An image may have any size. A pixel value may be an integer value ranging from 0 to 255, a binary value being 0 or 1, or a floating-point number. There may be one type or two or more types of colors. When there are a plurality of color types, the number of components of input data increases in proportion to the number of the types. Examples of input data include an RGB image, a multispectral image, and a hyperspectral image.

For example, the data acquisition unit 111 acquires input data by receiving the input data from a storage device internal or external to the learning device 31. The learning device 31 may include a device capable of acquiring input data, such as a camera, and the data acquisition unit 111 may receive input data from the device.

Correct answer data are data used in the variable derivation learning and specifically in an update of parameter values by the parameter updating unit 115 to be described later.

Correct answer data are data in which a target indicated by input data is recorded. At least one piece of correct answer data is data in which a target indicated by input data is recorded in a form different from a form in the input data. When input data and correct answer data represent images, a form may be reworded as a "way to be photographed" or a "way to be viewed." Examples of a form in an image include a direction, an angle, a position, a size, a degree of distortion, a hue, and clarity. A form that may differ between input data and correct answer data is predefined. In other words, the variable derivation unit 110 handles a set of input data and correct answer data between which at least one specific form differs. The learning device 31 may handle input data as one type of correct answer data.

For example, the data acquisition unit 111 acquires correct answer data by receiving the correct answer data from a storage device internal or external to the learning device 31. The learning device 31 may include a device capable of acquiring correct answer data, such as a camera, and the data acquisition unit 111 may receive correct answer data from the device.

Alternatively, the data acquisition unit 111 may generate correct answer data by processing input data. For example, the data acquisition unit 111 may generate correct answer data by processing input data, by using a process of changing a rotation angle of a target or a known technology of changing a hue or clarity.

Difference information is information indicating a relation between input data and correct answer data. Specifically, difference information indicates the difference between a form of a target indicated by input data and a form of the target indicated by correct answer data. For example, difference information may be represented by a parameter indicating existence of a difference or a degree of difference.

Figure 1A:
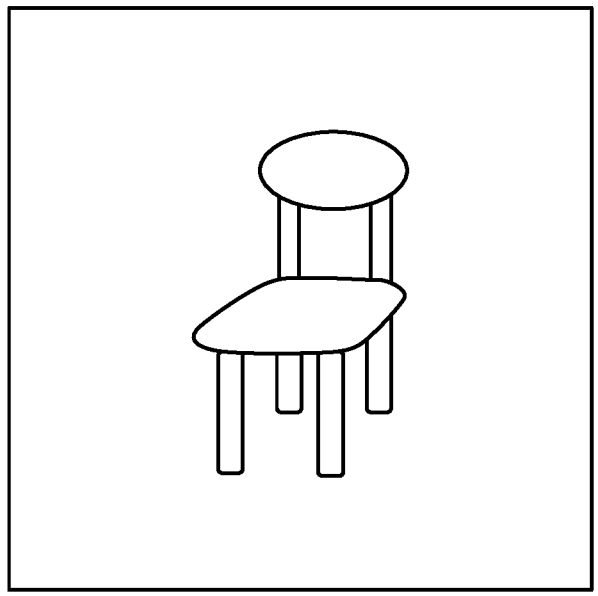
FIG. 1A is a diagram illustrating an example of data in which a target is recorded.
Figure 1B:
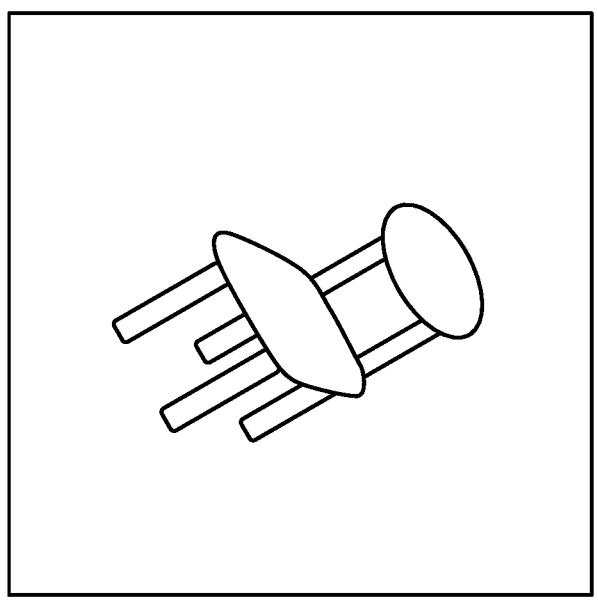
FIG. 1B is a diagram illustrating an example of data in which the target is recorded in another form.
Figure 1C:
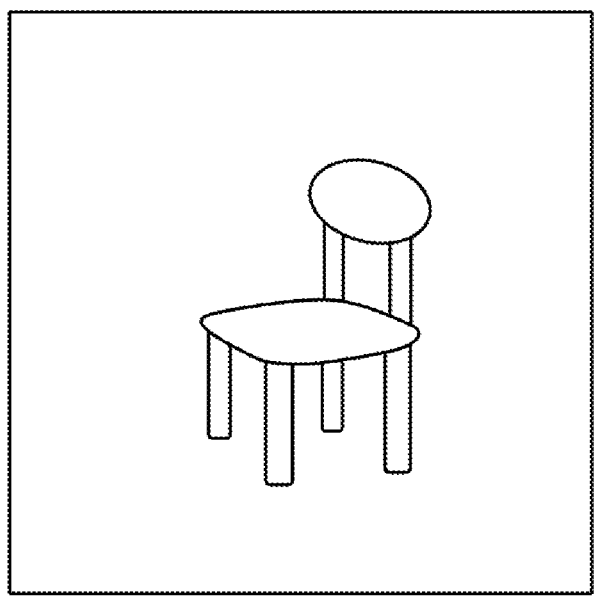
FIG. 1C is a diagram illustrating another example of data in which the target is recorded in another form.

As a simple example, it is assumed that input data represent an image in which a chair appears, and correct answer data represent an image of the chair photographed in a direction different from the direction in the input data. Examples of a set of input data and correct answer data include a set of an image in FIG. 1A and an image in FIG. 1B, and a set of the image in FIG. 1A and an image in FIG. 1C. An example of difference information indicating a relation between the image in FIG. 1A and the image in FIG. 1B is a value [such as "+60 (degrees)"] indicating a rotation angle. An example of difference information indicating a relation between the image in FIG. 1A and the image in FIG. 1C is a value [such as "−20 (degrees)"] indicating a change in an azimuth angle.

For example, when input data represent an optical image, examples of a difference indicated by difference information include a rotation angle with a direction perpendicular to a display surface of an image as an axis, a difference in an angle (a direction of a target relative to an imaging device), an amount of increase (or an amount of decrease) in brightness, a difference in contrast, a difference in a level of noise (noise originating in existence of rain, fog, or the like, or low resolution), and a difference in existence of an obstacle, an attachment, or an ornament, in comparison with input data. When a target is an object streaming in the wind, such as hair or a flag, difference information may be information indicating an intensity of the wind. A parameter closely related to the examples cited above may be employed as difference information. When input data and correct answer data are separately acquired, a form being a target indicated by employed difference information does not need to be a form a change of which can be represented by processing the input data.

Difference information may be a quantitative parameter or may be a parameter having a plurality of steps. As an example, when difference information is a parameter indicating an intensity of rain, the parameter may be represented by four types of values being "no rain," "light," "moderately heavy," and "heavy." Difference information may be a parameter taking only two values (for example, "existence" and "nonexistence").

For example, the data acquisition unit 111 acquires difference information by receiving the difference information from a storage device internal or external to the learning device 31. The data acquisition unit 111 may receive input of difference information from a person or a device grasping a relation between input data and correct answer data, and acquire the input difference information. The data acquisition unit 111 may acquire difference information by specifying the difference by comparison between input data and correct answer data.

Encoder 112

The encoder 112 derives a set of latent variable values from input data. For example, by using a neural network, the encoder 112 inputs input data to the input layer of the neural network and derives n values as an output. Note that n denotes the number of units in the output layer of the neural network. The set of n values is herein referred to as a set of latent variable values or a latent variable vector. While the term "vector" is used in the present example embodiment, a latent variable vector is not limited to a one-dimensional array of a plurality of values. The number of output values may be one. Alternatively, a latent variable vector may be a two-or-more-dimensional array. A latent variable vector may be held in the learning device 31 in a format other than an array format. Derivation of a latent variable vector by a neural network is also referred to as encoding.

A structure of a neural network used by the encoder 112 may be freely designed. For example, there is no limit on the number of layers, the number of components in each layer, and a connection method between components. As an example, the encoder 112 may use a convolutional neural network including an input layer with the number of components being 784, an intermediate layer with the number of components being 512, and an output layer with the number of components being 144. The number of values output by the encoder 112 (that is, the number of components of a latent variable vector) is typically configured to be less than the number of components in input data. However, the number of values output by the encoder 112 may be configured to be equal to or more than the number of components in input data.

An activation function used in a neural network used by the encoder 112 may be any activation function. Examples of an activation function include an identity function, a sigmoid function, a rectified linear unit (ReLU) function, and a hyperbolic tangent function.

The encoder 112 reads parameters (typically a weight and a bias) in a neural network to be used from the parameter storage unit 119 and performs encoding of input data.

Conversion Unit 113

The conversion unit 113 converts a latent variable vector output by the encoder 112 to another latent variable vector. Conversion of a latent variable vector by the conversion unit 113 is herein referred to as variable conversion.

The conversion unit 113 converts a latent variable vector by use of a conversion function. The conversion unit 113 uses different conversion functions according to the aforementioned difference information.

For example, the conversion unit 113 uses a conversion function using a conversion parameter taking a value that may vary according to difference information. After determining a conversion parameter according to difference information, the conversion unit 113 may convert a latent variable vector by use of a conversion function using the determined conversion parameter.

Examples of a conversion function include a function changing an arrangement of components of a latent variable vector. For example, a conversion function is a function shifting an arrangement of components of a latent variable vector. An amount of shift may be determined by a conversion parameter. A manipulation of shifting k components in an arrangement of components of a vector with the number of components being n is a manipulation of shifting the first to (n−k)-th components of the vector to the (k+1)-th to n-th components and shifting the (n−k)-th to n-th components to the first to k-th components.

It is assumed as a specific example that a conversion function is a function shifting an arrangement of components of a latent variable vector with the number of components being 144, based on a value of a conversion parameter p. It is assumed that difference information acquired by the data acquisition unit 111 is a rotation angle θ where θ takes a value being a multiple of 5 out of integers equal to or more than 0 and equal to or less than 360. In such a case, a value acquired by dividing θ by 5 may be defined as the conversion parameter p. Then, p is a parameter that may take an integer value in a range from 0 to 71. Then, the conversion function may be defined in such a way that a value twice the value of p corresponds to an amount of shift of the arrangement of the components of the latent variable vector. For example, a value of the conversion parameter p corresponding to a rotation of 40 degrees is 8 and is related to shifting 16 components in the arrangement of the components of the latent variable vector.

For example, a conversion function shifting an arrangement of components of a latent variable vector may be represented as a multiplication of a conversion matrix representing a shift. When a latent variable vector is denoted as $Z_0$, the number of components of the latent variable vector is denoted as n, a value of a conversion parameter is denoted as k, and a conversion matrix representing a shift is denoted as $S_k$, $S_k$ is an n×n matrix, and the aforementioned conversion function is represented by the following equation. $F(k, Z_0) = S_k \cdot Z_0$ The matrix $S_k$ is a matrix illustrated in FIG. 3. Specifically, the matrix $S_k$ is a matrix in which a numerical value of the i-th row and the (kr+i)-th column is 1 for i where 1≤i≤n−kr, a numerical value of the (n−kr+j)-th row and the j-th column is 1 for j where 1≤j≤kr, and every remaining numerical value is 0. Note that kr is a value determined by k×n/N(k) when the number of value that may be taken by k is denoted as N(k).

By the conversion by the conversion unit 113, a new latent variable vector with the number of components being n is generated.

A generation method of a function and a matrix for variable conversion is not limited to the above. For example, the conversion unit 113 may use a matrix generated by applying a Gaussian filter to the aforementioned matrix $S_k$ in place of the matrix $S_k$.

The type of variable conversion is not limited to the shift manipulation described above. For example, variable conversion may be subtraction processing on a component value by which an amount of subtraction increases according to magnitude of a difference indicated by difference information. Variable conversion may be smoothing processing executed a number of times based on magnitude of a difference indicated by difference information. Variable conversion is an operation on a predetermined component, and details of the operation or the number of components undergoing the operation may depend on magnitude of a difference indicated by difference information.

Variable conversion performed by the conversion unit 113 may include identity transformation. Variable conversion in a case of difference information indicating nonexistence of a difference in particular may be identity transformation.

When there are two or more types of forms that may be different between input data and correct answer data, the conversion unit 113 may perform a variable conversion, based on difference information related to each form. As an example, when difference information is denoted by two parameters (α, β) each indicating a change in a three-dimensional direction, the conversion unit 113 may generate a new latent variable vector by applying a conversion function dependent on α to a latent variable vector and then applying a conversion function dependent on β. The conversion function dependent on a and the conversion function dependent on β may be applied in parallel. Alternatively, the conversion unit 113 may determine one conversion function, based on difference information about each of the differences between two or more types of forms and execute a variable conversion by use of the conversion function.

Decoder 114

The decoder 114 generates output data from a latent variable vector after conversion by the conversion unit 113. For example, by using a neural network (different from the neural network used by the encoder 112), the decoder 114 inputs a latent variable vector to the input layer of the neural network and generates output data composed of m components as an output. Note that m is the number of units in the output layer of the neural network used by the decoder 114. The value m is set to the same value as the number of components of correct answer data. When input data and correct answer data are data represented in the same format, m matches the number of components of the input data, that is, the number of units in the input layer of the encoder 112. Generation of output data from a latent variable vector by a neural network is also referred to as decoding.

A structure of a neural network used by the decoder 114 may be freely designed. For example, there is no limit on the number of layers, the number of components in an intermediate layer (in a case of a multilayer neural network), and a connection method between components. As an example, the decoder 114 may use a neural network including an input layer with the number of components being 144, an intermediate layer with the number of components being 512, and an output layer with the number of components being 784.

An activation function used in a neural network used by the decoder 114 may be any activation function. Examples of an activation function include an identity function, a sigmoid function, a ReLU function, and a hyperbolic tangent function.

The decoder 114 reads values of parameters (typically a weight and a bias) in a neural network to be used from the parameter storage unit 119 and performs decoding of a latent variable vector.

Parameter Updating Unit 115

The parameter updating unit 115 updates parameter values of neural networks used by the encoder 112 and the decoder 114, based on a comparison between output data generated by the decoder 114 and correct answer data acquired by the data acquisition unit 111.

A specific example of a parameter value updating procedure will be described. First, for each of one or more sets of correct answer data and output data, the parameter updating unit 115 calculates an error of the output data with respect to the correct answer data. For example, the parameter updating unit 115 may use a mean square error as an error function for determining an error. Then, the parameter updating unit 115 determines new parameter values in such a way as to reduce the calculated error. A method known as a parameter value optimization method employed in a common autoencoder may be used as a technique for determining new parameter values. As an example, the parameter updating unit 115 may calculate a gradient by use of error back propagation and determine parameter values by use of stochastic gradient decent (SGD). Other employable techniques include "RMSprop," "Adagrad," "Adadelta," and "Adam."

Then, the parameter updating unit 115 records the determined new parameter values into the parameter storage unit 119. The encoder 112 and the decoder 114 thereafter use the new parameter values. The above concludes the specific updating procedure.

Target parameter values to be updated by the parameter updating unit 115 are a weight and a bias of a neural network used by the encoder 112, and a weight and a bias of a neural network used by the decoder 114. A conversion parameter used in a variable conversion is not included in the target parameters to be updated by the parameter updating unit 115.

The parameter updating unit 115 may repeatedly update parameter values a predetermined number of times. For example, the predetermined number of times may be determined as a value received as an input of a numerical value indicating the predetermined number of times from a user of the learning device 31 through an input interface.

An error function used by the parameter updating unit 115 for determining an error may be freely designed. The parameter updating unit 115 may use an error function considering values of an average and a variance of a latent variable vector, such as an error function used in a variational autoencoder (VAE).

Outline of Processing Related to Variable Derivation Learning

Figure 4:
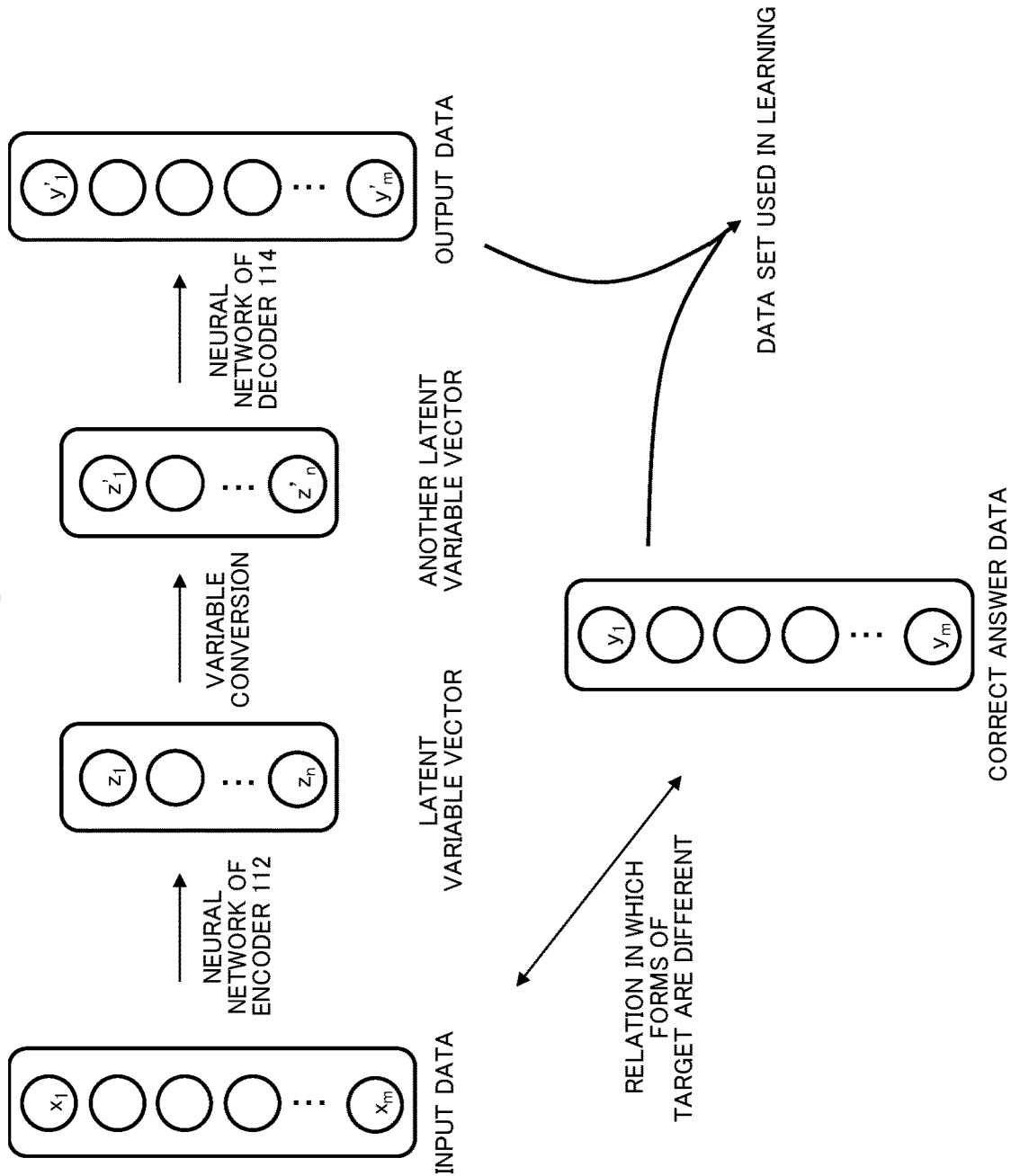
FIG. 4 is a conceptual diagram for illustrating variable derivation learning according to the first example embodiment.

An outline of processing related to the variable derivation learning by the variable derivation unit 110 will be described referring to FIG. 4.

First, a latent variable vector having n components ($z_1$, $z_2$, ..., $z_n$) are derived from input data having m data values ($x_1$, $x_2$, ..., $x_m$) as components by a neural network of the encoder 112. The latent variable vector is converted to another latent variable vector having n components ($z'_1$, $z'_2$, ..., $z'n$) by a variable conversion by the conversion unit 113. Output data having m components ($y'_1$, $y'_2$, ..., $y'_m$) are generated from the another latent variable vector by a neural network of the decoder 114.

A set of the thus generated output data and correct answer data having m components ($y_1$, $y_2$, ..., $y_m$) and being in such a relation with the input data that forms of the target are different is used for learning as a training data set.

Processing Flow Related to Variable Derivation Learning

Figure 5:
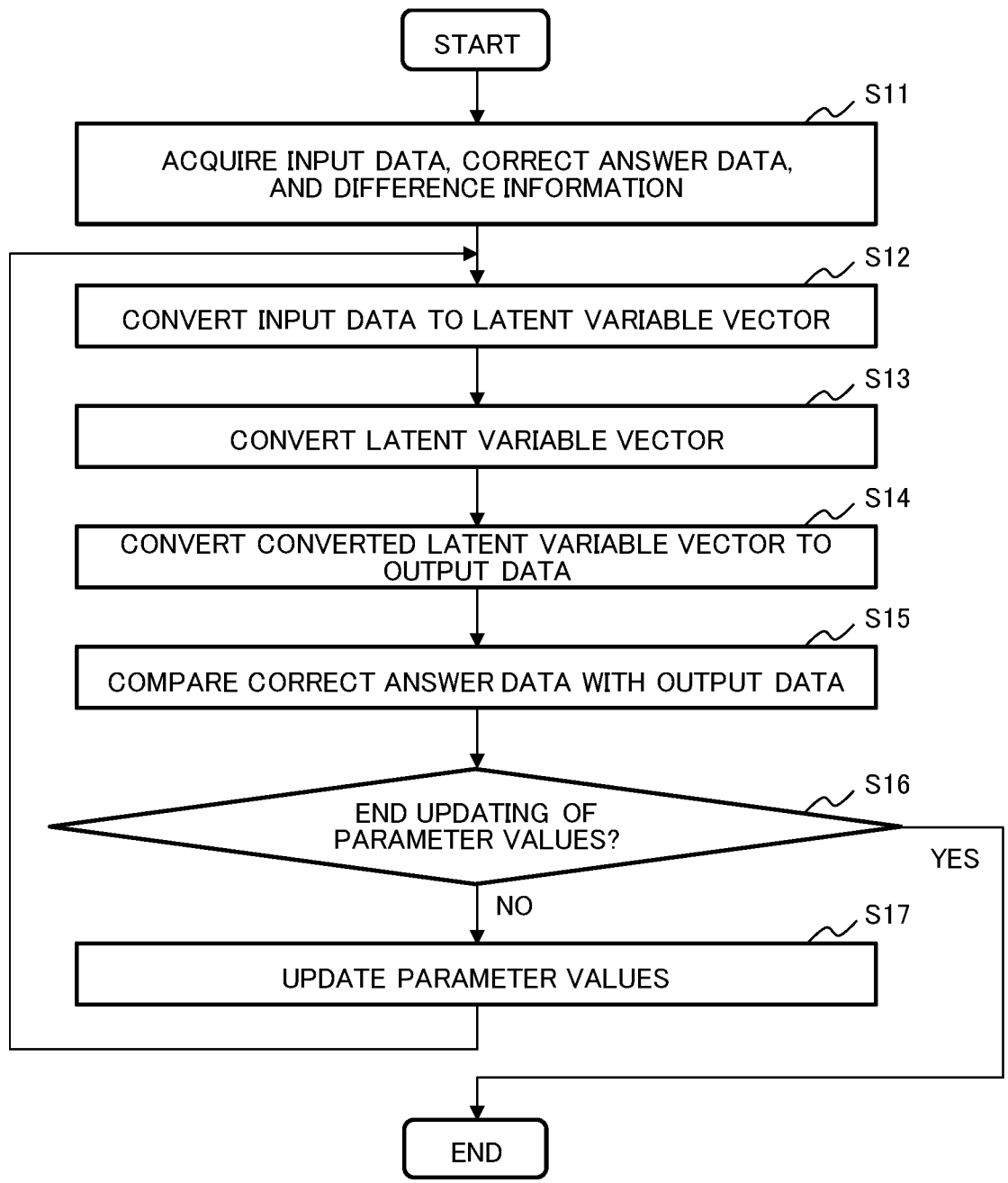
FIG. 5 is a flowchart illustrating a processing flow related to the variable derivation learning.

A processing flow related to the variable derivation learning by the variable derivation unit 110 will be described referring to a flowchart in FIG. 5. When each type of processing included in the processing related to the variable derivation learning is executed by a device executing a program, the each type of processing may be executed according to the order of instructions in the program. When each type of processing is executed by a separate device, processing may be executed by a device completing the previous processing giving notification to a device executing the processing. For example, each unit performing processing records data generated by each type of processing into a storage area included in the learning device 31 or an external storage device. Each unit performing processing may receive data required for each type of processing from a unit generating the data or read the data from the aforementioned storage area included in the learning device 31 or the aforementioned external storage device.

First, the data acquisition unit 111 acquires input data, correct answer data, and difference information (Step S11). Timings at which the pieces of data are acquired may not be the same. A timing at which data are acquired may be any time before processing in a step in which the data are used is performed.

Next, the encoder 112 converts the input data to a latent variable vector (Step S12).

Next, the conversion unit 113 converts the latent variable vector by use of conversion parameter values based on a difference indicated by the difference information (Step S13).

Next, the decoder 114 converts the converted latent variable vector to output data (Step S14).

Next, the parameter updating unit 115 determines whether to end updating of parameter values used in the encoder 112 and the decoder 114.

For example, a case of ending updating is a case of the number of times the parameter updating unit 115 updates the parameter values reaching a predetermined number of times.

As another example, a case of ending updating may be a case of an error of the output data with respect to the correct answer data being sufficiently small. For example, the parameter updating unit 115 may determine that the error is sufficiently small in the following cases and determine to end updating.

When a value indicating the error falls below a predetermined reference value, when the error is unable be decreased any more, or when a decrement (that is, the difference between the error immediately before the last update and the error after the update) or a decline rate (that is, a ratio of the decrement to the current error) of the error falls below a predetermined reference value.

Alternatively, the parameter updating unit 115 may determine to end updating when an average value or a maximum value of an absolute amount of change in each parameter value (that is, an absolute value of an amount of change in a parameter value when updating is performed) or an average value or a maximum value of a rate of change (that is, a ratio of the absolute amount of change to the current value) falls below a predetermined reference value.

When not ending updating (NO in Step S16), the parameter updating unit 115 updates the parameter values (Step S17), and the variable derivation unit 110 performs the processing in Steps S12 to Step S14 again. In the processing in Step S12 and Step S14 from the second time onward, the encoder 112 and the decoder 114 perform the processing by use of the updated parameter values. The parameter updating unit 115 compares output data newly generated by the processing in Step S14 with the correct answer data again (Step S15) and determines whether to end updating of the parameter values. Thus, the variable derivation unit 110 repeats updating of the parameter values and generation of output data using the updated parameter values until updating of the parameters is determined to be ended. Processing of updating the parameter values through such repetition is the variable derivation learning. The parameter updating unit 115 updates parameter values by, in a sense, learning with a set of output data and correct answer data as a training data set. Making parameter values more suitable values by repeatedly performing updates is also referred to as optimization.

When updating of parameter values is determined to be ended (YES in Step S16), the processing of the variable derivation learning ends.

Effects of Variable Derivation Learning

For the same target, the variable derivation unit 110 can derive interrelated latent variable vectors respectively representing features of different forms of the target.

Based on the aforementioned specific example, an example of an effect provided by the variable derivation unit 110 is as follows.

The encoder 112, the conversion unit 113, and the decoder 114 in the variable derivation unit 110 after completion of learning can generate a plurality of images representing different forms of a target, according to a conversion parameter. Accordingly, even when a form of the target in an image changes, a latent variable vector output by the encoder 112 can represent the change by a conversion. In other words, a combination of the encoder 112 and the conversion unit 113 can generate interrelated latent variable vectors respectively representing features of the different forms of the target.

When a difference between forms is a difference that may be represented quantitatively, a set of the conversion unit 113 and the decoder 114 may generate data in which a form not included in correct answer data is recorded. For example, it is assumed in the variable derivation learning that data in which a target in a certain form (denoted as a "form SA") is recorded and data in which the target in another form (denoted as a "form SC") is recorded are respectively used as correct answer data. The conversion unit 113 can generate a latent variable vector representing the target in a form (denoted as a "form SB") corresponding to a form between the form SA and the form SC from a latent variable vector representing the target in the form SA, by a variable conversion using a half value of a value of a conversion parameter corresponding to a change from the form SA to the form SC. By generating output data from the latent variable vector by the decoder 114, output data in which the target in the form SB is recorded may be generated.

Even when a difference between forms is a difference not represented quantitatively, the set of the conversion unit 113 and the decoder 114 may generate data in which a form not included in correct answer data is recorded. For example, it is assumed in the variable derivation learning that data in which a certain target (denoted as a "target TA") in the form SA is recorded, data in which the target TA in the form SB is recorded, and data in which another target (denoted as a "target TB") in the form SA is recorded are respectively used as correct answer data. By the learning, the set of the conversion unit 113 and the decoder 114 can generate data in which the target TA in the form SA is recorded and data in which the target TA in the form SB is recorded from a latent variable vector. Accordingly, the conversion unit 113 is considered to be able to derive a latent variable vector representing the target TB in the form SB by converting the latent variable vector representing the target TB in the form SA. Then, it is expected that, by decoding, the converted latent variable vector can generate data in which the target TB in the form SB is recorded.

When a difference between forms is a difference that may be represented quantitatively, the encoder 112 may be able to derive a latent variable vector representing a target in a form not included in input data. For example, it is assumed in the variable derivation learning that data in which a target in the form SA is recorded and data in which the target in the form SC is recorded are respectively used as input data. When data in which the target in the form SB corresponding to a form between the form SA and the form SC is recorded are input to the encoder 112 after optimization of parameter values, a derived latent variable vector may be similar to (or match) a latent variable vector that can be generated from a latent variable vector representing the target in the form SA by performing a variable conversion. In other words, from the target in a form not used in the learning, the encoder 112 may be able to derive a latent variable vector that can be converted to a latent variable vector representing a form other than the form.

Even when a difference between forms is a difference not represented quantitatively, the encoder 112 may derive a latent variable vector representing the target in a form not included in input data. For example, it is assumed in the variable derivation learning that data in which the target TA in the form SA is recorded, data in which the target TA in the form SB is recorded, and data in which the target TB in the form SA is recorded are respectively used as input data. By the learning, the encoder 112 can derive a latent variable vector representing the target TA in the form SB. Accordingly, the encoder 112 is considered to be also able to derive a latent variable vector representing the target TB in the form SB from data in which the target TB in the form SB is recorded. Then, it is expected that, by a variable conversion, a latent variable vector representing the target TB in the form SA can be converted from the derived latent variable vector.

As described above, by the variable derivation learning, the encoder 112 may be able to derive interconvertible latent variable vectors by a conversion using a conversion parameter for the same target in a different form.

Supplement

The learning device 31 may handle any type of data, any target, and any difference in forms, as long as two or more pieces of data in which forms of a target are different and information (difference information) indicating the differences between the data can be acquired.

Input data are not limited to an optical image. Input data may be any data as long as a target a form of which may change can be recorded in the data, and the data can be represented by a variable that may be converted by a neural network.

An example of input data is SAR data. SAR data are sensing data acquired by a synthetic aperture radar (SAR). Examples of a target recorded by SAR data include a topography, a structure, a vehicle, an aircraft, and a ship. Examples of a changeable form include an azimuth angle and a depression angle when SAR data are acquired. In other words, a difference resulting from a condition when sensing is performed by a SAR may be employed as a difference handled by the learning device 31.

For example, input data may be time series data of sensing data acquired by a sensing device.

For example, input data may be sound data. Sound data are data in which a sound is recorded. When input data are sound data, the input data may be represented specifically by an amplitude per unit time, an intensity of a spectrogram per time window, or the like.

When input data are sound data, examples of a target include a human voice, a speech content, an acoustic event, and music. An acoustic event refers to a sound indicating occurrence of some event, such as a scream or a glass shattering sound. When input data are sound data, examples of a variable form include a frequency (a pitch of a sound), a recording place, an echo level, a tone, a reproduction speed (a tempo) of data, a noise level, a type of object generating a sound, and a person generating a sound or an emotional state of the person.

Classification Learning Unit 310

A configuration and an operation of the classification learning unit 310 will be described.

Configuration

Referring to FIG. 2, the classification learning unit 310 includes a data acquisition unit 311, a conversion unit 313, a classification unit 317, a parameter updating unit 315, an output unit 316, and a parameter storage unit 319.

For example, the data acquisition unit 311, the conversion unit 313, the classification unit 317, the parameter updating unit 315, and the output unit 316 are provided by one or a plurality of CPUs executing a program.

For example, the parameter storage unit 319 is a memory. The parameter storage unit 319 may be an auxiliary storage device such as a hard disk. According to another example embodiment, the parameter storage unit 319 may be configured to be external to the learning device 31 and be communicable with the learning device 31 in a wired or wireless manner. The parameter storage unit 319 stores parameters used in classification performed by the classification unit 317.

The learning device 31 may include a storage device transitorily or non-transitorily storing data, aside from the parameter storage unit 319.

Data Acquisition Unit 311

The data acquisition unit 311 acquires data used by the classification learning unit 310. Data used by the classification learning unit 310 are a latent variable vector derived by the encoder 112 and correct answer information.

Correct answer information is information considered desirable as information to be output as a classification result by the classification unit 317 to be described later. Correct answer information is given as a set with input data. Correct answer information is information to be output when a target indicated in input data associated with the correct answer information is correctly identified.

For example, when classification performed by the classification unit 317 is multi-class classification identifying which of L (where L is any integer equal to or more than 2) classes a target belongs to, correct answer information may be an L-dimensional vector in which a value of any one component is "1," and values of the other components are "0." Such a vector is also referred to as one-hot data. In the one-hot data, each component is associated with a class. In other words, the one-hot data indicates that the target is classified as a class associated with the component with the value "1."

For example, when classification performed by the classification unit 317 is binary classification identifying whether a target is a specific object, correct answer information may be information taking a value of "1" or "0."

Correct answer information is compared with a classification result by the classification unit 317 in updating of parameter values by the parameter updating unit 315 to be described later.

The data acquisition unit 311 may acquire a latent variable vector derived by the encoder 112 by reading the vector from the latent variable storage unit 118.

Conversion Unit 313

The conversion unit 313 converts a latent variable vector derived by the encoder 112 to another latent variable vector. The conversion unit 313 performs a variable conversion using a conversion function, similarly to the conversion unit 113.

The conversion function used by the conversion unit 313 is the same type of conversion function as the conversion unit 113, differing only in a value of a conversion parameter at most.

The conversion unit 313 may generate a plurality of separate latent variable vectors by a plurality of variable conversions using various values of the conversion parameter.

Classification Unit 317

The classification unit 317 performs classification on a latent variable vector output by the conversion unit 313.

For example, by use of a neural network, the classification unit 317 inputs a latent variable vector to the input layer of the neural network and generates information indicating a classification result as an output.

For example, when the classification unit 317 is used as a multi-class classifier, information indicating a classification result is a multidimensional vector indicating a distribution of a probability (may also be referred to as a likelihood) that a target belongs to a classification class. The number of components of the multidimensional vector in such a case is the number of classification classes. When the classification unit 317 is used as a binary classifier, information indicating a classification result may be a numerical value indicating a probability that a target is a predetermined recognition target. In any event, information indicating a classification result is data represented by a format comparable with correct answer information.

A structure of a neural network used by the classification unit 317 may be freely designed. For example, there is no limit on the number of layers, the number of components in an intermediate layer (in a case of a multilayer neural network), and a connection method between components. An activation function used in a neural network used by the classification unit 317 may be any activation function.

The classification unit 317 reads values of parameters (typically a weight and a bias) in a neural network to be used from the parameter storage unit 319 and performs classification.

Parameter Updating Unit 315

The parameter updating unit 315 updates parameter values of a neural network used by the classification unit 317, based on a comparison between information indicating a classification result by the classification unit 317 and correct answer information acquired by the data acquisition unit 311.

A specific example of an updating procedure of parameter values will be described. First, for each of one or more sets of information indicating a classification result and correct answer information, the parameter updating unit 315 calculates an error of the information indicating the classification result with respect to the correct answer information. For example, the parameter updating unit 315 may use cross entropy as an error function for determining an error. Then, the parameter updating unit 315 determines new parameter values in such a way as to reduce the calculated error. A method known as an optimization method of parameter values employed in learning by a common classifier may be used as a technique for determining new parameter values. As an example, the parameter updating unit 315 may calculate a gradient by use of error back propagation and determine parameter values by use of SGD. Other employable techniques include "RMSprop," "Adagrad," "Adadelta," and "Adam."

Then, the parameter updating unit 315 records the determined new parameter values into the parameter storage unit 319. The classification unit 317 thereafter uses the new parameter values. The above concludes the specific updating procedure.

The parameter updating unit 315 may repeatedly perform parameter value updating a predetermined number of times. For example, the predetermined number of times may be determined as a value received as an input of a numerical value indicating the predetermined number of times from a user of the learning device 31 through an input interface.

Output Unit 316

The output unit 316 outputs information about parameter values updated by the parameter updating unit 315. For example, the output unit 316 outputs parameter values optimized by repeatedly updating the parameter values by the parameter updating unit 315. Examples of an output destination of an output by the output unit 316 include a display device, a storage device, and a communication network. When the output unit 316 outputs information to a display device, the output unit 316 may convert information in such a way that the display device can display the information. The aforementioned display device and storage device may be devices external to the learning device 31 or components included in the learning device 31.

Processing Flow Related to Classification Learning

Figure 6:
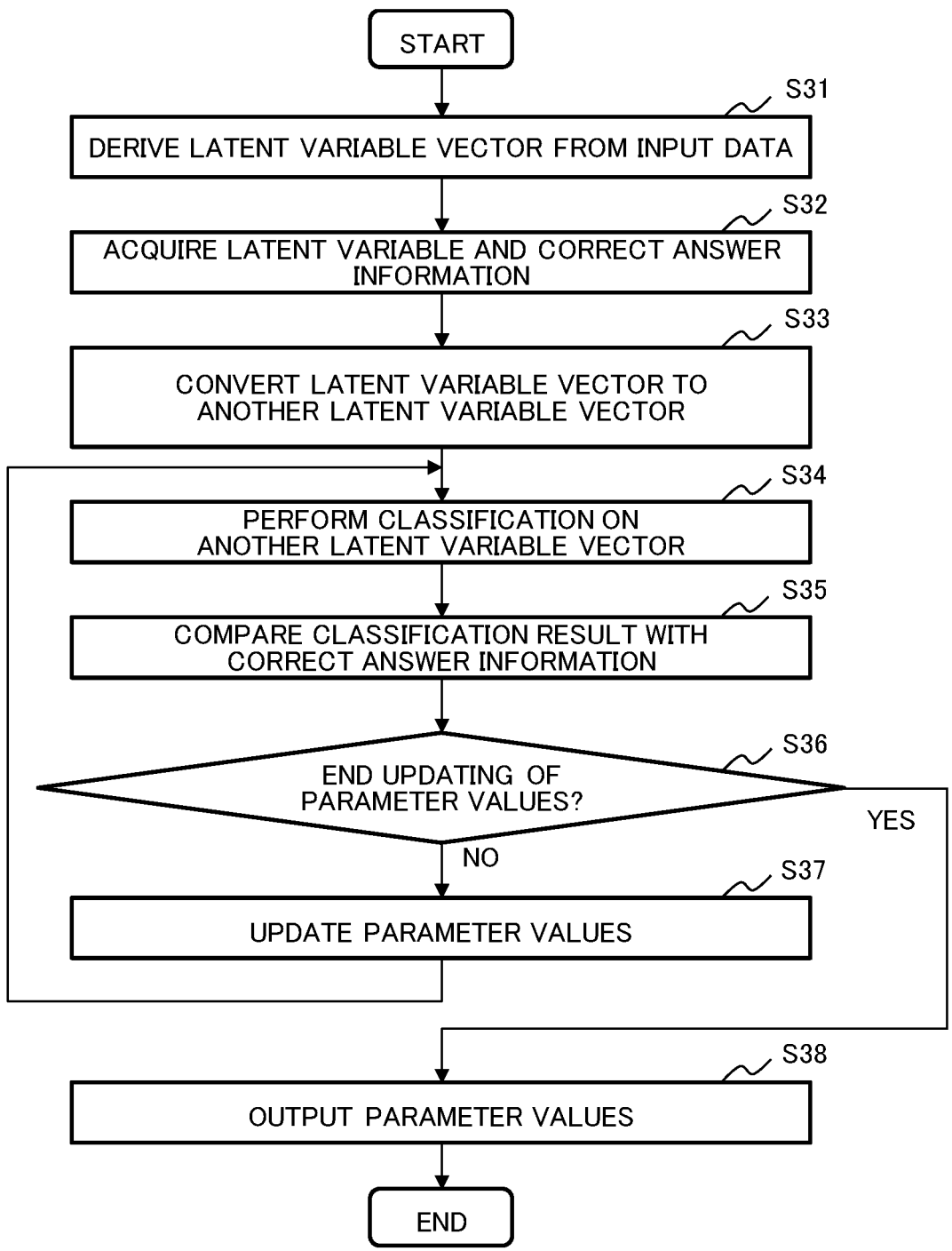
FIG. 6 is a flowchart illustrating a processing flow related to identification processing.

A processing flow related to the classification learning by the classification learning unit 310 will be described referring to a flowchart in FIG. 6. When each type of processing related to the classification learning is executed by a device executing a program, the each type of processing included in the processing may be executed according to the order of instructions in the program. When each type of processing is executed by a separate device, processing may be executed by a device completing the previous processing giving notification to a device executing the processing. For example, each unit performing processing records data generated by each type of processing into a storage area included in the learning device 31 or an external storage device. Each unit performing processing may receive data required for each type of processing from a unit generating the data or read the data from the aforementioned storage area included in the learning device 31 or the aforementioned external storage device.

First, the encoder 112 derives a latent variable vector from input data by use of parameter values optimized by the variable derivation learning (Step S31). The encoder 112 records the derived latent variable vector into the latent variable storage unit 118.

Next, the data acquisition unit 311 acquires the latent variable vector derived by the encoder 112 and correct answer information (Step S32). The correct answer information is input to the learning device 31 as a set with the input data. In other words, the correct answer information is associated with the input data and the latent variable vector derived from the input data.

Next, the conversion unit 313 converts the latent variable vector to another latent variable vector (Step S33).

Next, the classification unit 317 performs classification on the aforementioned another latent variable vector (Step S34).

Next, the parameter updating unit 315 determines whether to end updating of values of parameters used by the encoder 112 and the decoder 114.

For example, a case of ending updating is a case of the number of times the parameter updating unit 315 updates the parameter values reaching a predetermined number of times.

As another example, a case of ending updating may be a case of an error of output data with respect to correct answer data being sufficiently small. For example, the parameter updating unit 315 may determine that the error is sufficiently small in the following cases and determine to end updating.

When a value indicating the error falls below a predetermined reference value, when the error is unable to be decreased any more, or when a decrement (that is, the difference between the error immediately before the last update and the error after the update) or a decline rate (that is, a ratio of the decrement to the current error) of the error falls below a predetermined reference value.

Alternatively, the parameter updating unit 315 may determine to end updating when an average value or a maximum value of an absolute amount of change in each parameter value (that is, an absolute value of an amount of change in a parameter value when updating is performed) or an average value or a maximum value of a rate of change (that is, a ratio of the absolute amount of change to the current value) falls below a predetermined reference value.

When not ending updating (NO in Step S36), the parameter updating unit 315 updates the parameter values (Step S37), and the classification learning unit 310 performs the processing in Step S34 and Step S35 again. In the processing in Step S34 from the second time onward, the classification unit 317 performs classification by use of the updated parameter values. The parameter updating unit 315 compares a classification result newly generated by the processing in Step S34 with the correct answer information again (Step S35) and determines whether to end updating of the parameter values. Thus, the classification learning unit 310 repeats updating of the parameter values and classification using the updated parameter values until updating of the parameters is determined to be ended. Processing of updating parameter values through such repetition is the classification learning. The parameter updating unit 315 updates parameter values by, in a sense, learning with a set of a classification result and correct answer information as a training data set.

When updating of the parameter values is determined to be ended (YES in Step S36), the output unit 316 outputs the parameter values (Step S38).

Effects

As a result of the classification learning described above, the classification unit 317 using updated parameter values can output a correct classification result from each of latent vectors representing various forms of a target. Accordingly, by combining the encoder 112 and the classification unit 317, an identifier capable of identifying a target in various forms can be generated.

In learning for generating the encoder 112, preparation of data in which a target takes every form is not necessarily required, as already described. In other words, the learning device 31 can generate an identifier capable of identifying a target in various forms even when the number of samples of data in which the target is recorded is small.

Second Example Embodiment

A learning device may not include a variable derivation unit 110. A learning device has only to be configured in such a way as to be able to acquire a latent variable vector derived by an encoder configured to derive interconvertible latent variable vectors by variable conversion for the same target in different forms.

Figure 7:
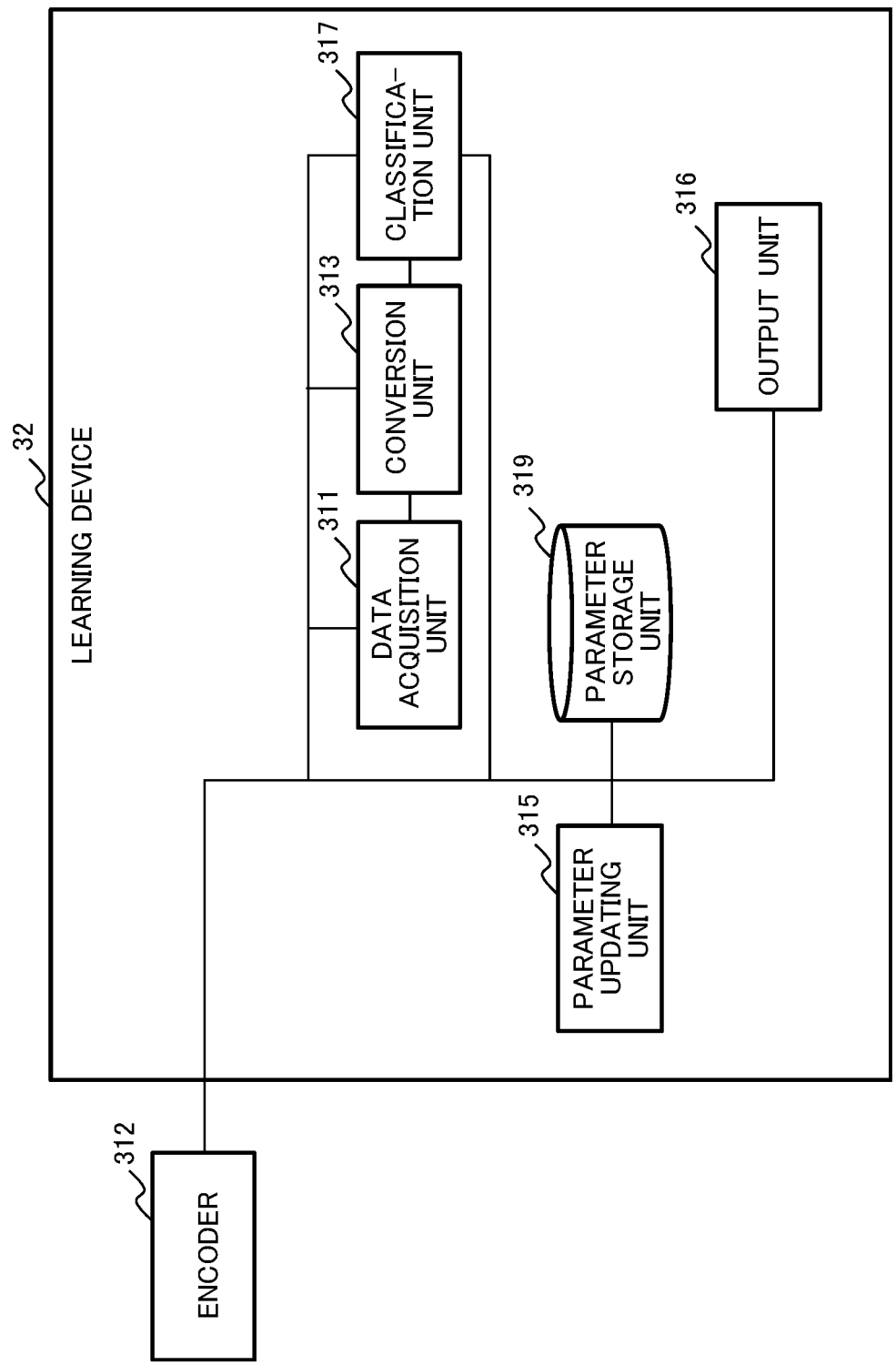
FIG. 7 is a block diagram illustrating a configuration of a learning device according to a second example embodiment of the present invention.

FIG. 7 is a block diagram illustrating a configuration of a learning device 32 according to a second example embodiment of the present invention. The learning device 32 includes the configuration included in the classification learning unit 310 according to the first example embodiment, that is, a data acquisition unit 311, a conversion unit 313, a classification unit 317, a parameter updating unit 315, an output unit 316, and a parameter storage unit 319. The learning device 32 is communicably connected to an encoder 312 in a wired or wireless manner.

For example, the encoder 312 is the encoder 112 according to the first example embodiment. The encoder 112 is configured to derive a latent variable vector by use of a neural network using the parameter values optimized by the variable derivation learning described in the description of the first example embodiment.

The learning device 32 can also generate an identifier capable of identifying a target in various forms. The reason is the same as the reason described in the description of the first example embodiment.

The encoder 312 does not need to be the encoder 112 according to the first example embodiment. Another method for configuring the encoder 312 having a desired function (that is, a function of deriving interconvertible latent variable vectors for the same target in different forms by variable conversion) will be described below.

For example, the encoder 312 may be generated by performing learning with a target in various forms as correct answer data and interconvertible latent variable vectors as correct answers. In the learning, output data generated by the decoder 114 according to the first example embodiment may be employed as correct answer data, and latent variable vectors output by the conversion unit 113 according to the first example embodiment may be employed as latent variable vectors to be correct answer.

Figure 8:
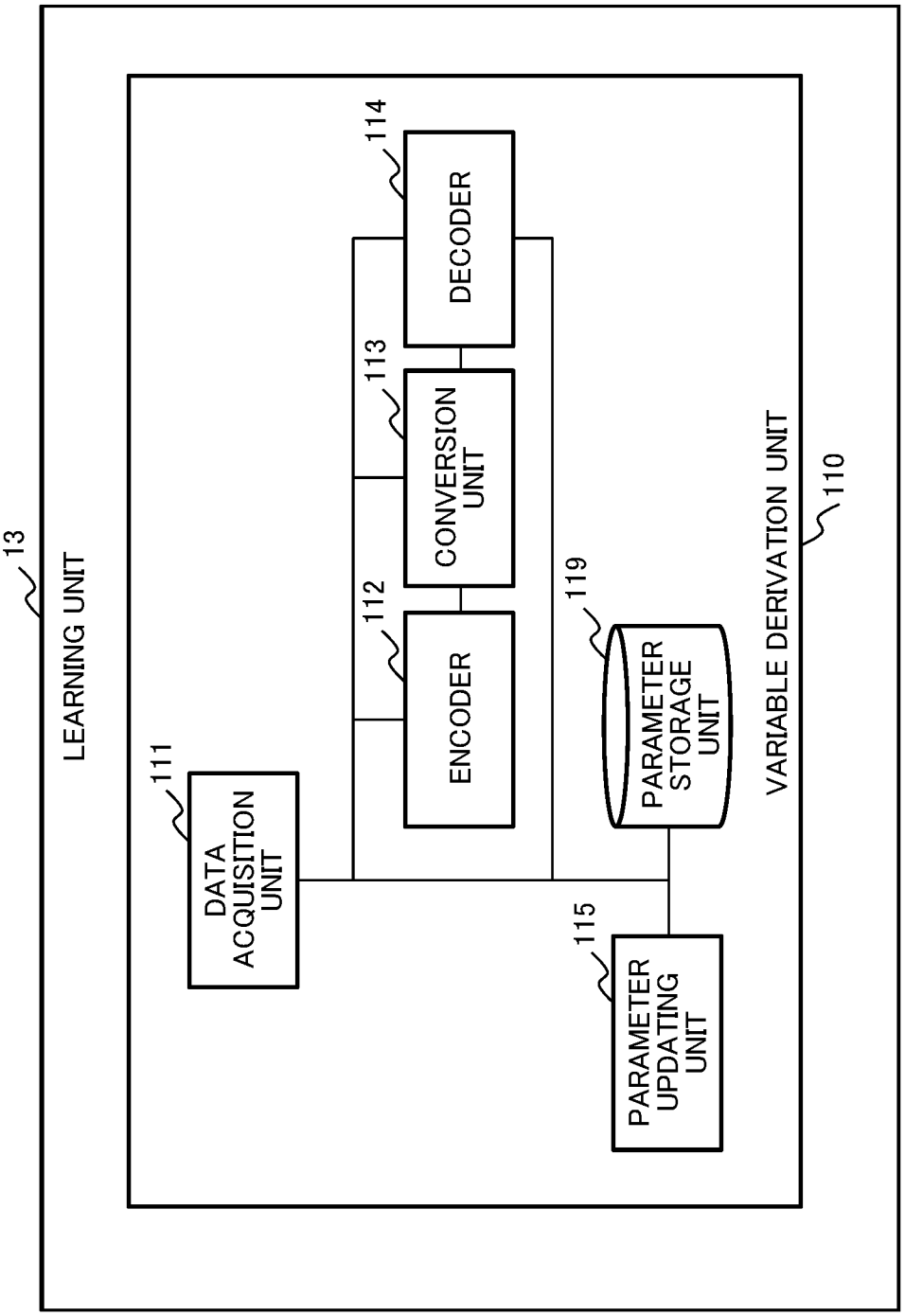
FIG. 8 is a block diagram illustrating a configuration of an example of a learning device generating an encoder having a desired function.

As an example, one of methods of generating the encoder 312 having the desired function is the following method. First, a learning device 13 including a variable derivation unit 110 as illustrated in FIG. 8 is prepared. The learning device 13 performs the variable derivation learning described in the first example embodiment by using data in which various forms of a target TA are respectively recorded as input data. Consequently, output data in which various forms of the target TA are respectively recorded can be output by a combination of an encoder 112, a conversion unit 113, and a decoder 114. Next, the learning device 13 derives, by the encoder 112, a latent variable vector from data in which a target TB in a certain form is recorded. Then, by converting the latent variable vector by a variable conversion and generating output data, the learning device 13 acquires a set of output data in which the target TB in an unlearned form is recorded and a latent variable vector.

By use of the aforementioned set, the encoder 312 performs learning for deriving a correct latent variable vector from the data in which the target TB in the unlearned form is recorded. Consequently, the encoder 312 can derive a latent variable vector that can be converted from the data in which the target TB in the unlearned form is recorded to a latent variable vector representing the target TB in a learned form.

Data that need to be prepared in the aforementioned method are data in which various forms of the target TA are respectively recorded and data in which the target TB in a certain form is recorded. Data in which the target TB in an unlearned form is recorded do not need to be prepared.

Third Example Embodiment

Figure 9:
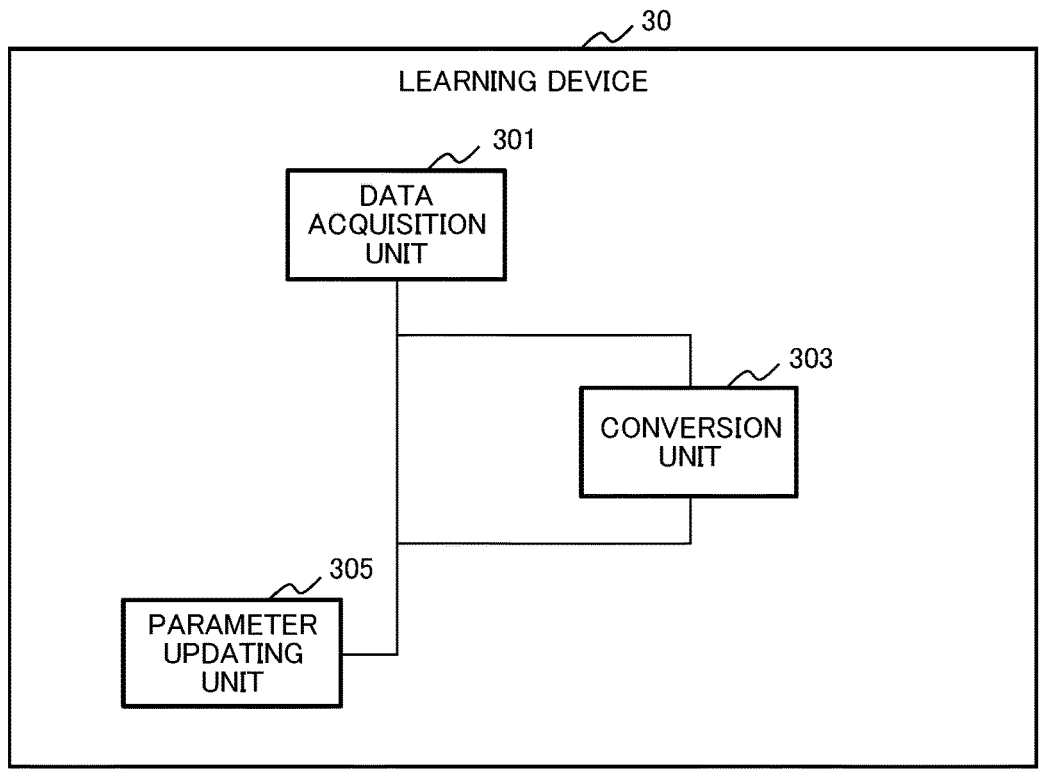
FIG. 9 is a block diagram illustrating a configuration of a learning device according to one example embodiment of the present invention.

A learning device 30 according to one example embodiment of the present invention will be described. FIG. 9 is a block diagram illustrating a configuration of the learning device 30. The learning device 30 includes a data acquisition unit 301, a conversion unit 303, and a parameter updating unit 305.

The data acquisition unit 301 acquires a first feature value derived from data in which an identification target is recorded. The first feature value is a feature value derived by an encoder configured to derive interconvertible feature values from data in which different forms of the same target are respectively recorded, by a conversion using a conversion parameter taking a value based on the difference between the forms. A method of implementing the aforementioned encoder is as already described.

A feature value according to the present example embodiment refers to a set of values derived from input data by the encoder. A feature value may also be referred to as information representing a target, a data representation, or the like. Derivation of a feature value may also be referred to as "extracting a feature value." A "latent variable vector" according to each of the aforementioned example embodiments corresponds to a "feature value" according to the present example embodiment. A form in which a feature value held in the learning device 30 is not considered relevant. For example, a feature value may be held in an array format or may be held as values of variables assigned with names, respectively.

The conversion unit 303 generates a second feature value by performing a conversion using a conversion parameter on a first feature value acquired by the data acquisition unit 301.

The parameter updating unit 305 updates values of parameters (hereinafter also referred to as "classification parameters") used in classification by a classifier (unillustrated). The classifier is a module configured to perform classification with a feature value as an input. The classification unit 317 according to each of the aforementioned example embodiments corresponds to the classifier. The classifier may or may not be included in the learning device 30. The learning device 30 and a device having the classifier function may be communicably connected to each other. The classification parameter may be stored by the learning device or may be stored by the device having the classifier function. For example, the classification parameters are a weight and a bias that are generally used in a neural network.

The parameter updating unit 305 updates values of classification parameters in such a way that the classifier outputs a result indicating a class associated with an identification target as a classification when a second feature value is determined as an input. Specifically, the learning device 30 performs learning with a set of a second feature value and a result indicating a class associated with an identification target as a classification as training data.

For example, updating classification parameter values refers to recording new values of classification parameters into a storage unit storing the classification parameters. The parameter updating unit 305 may output the new values of the classification parameters to a device (for example, a storage device, a display device, or an information processing device using the classifier) external to the learning device 30.

Figure 10:
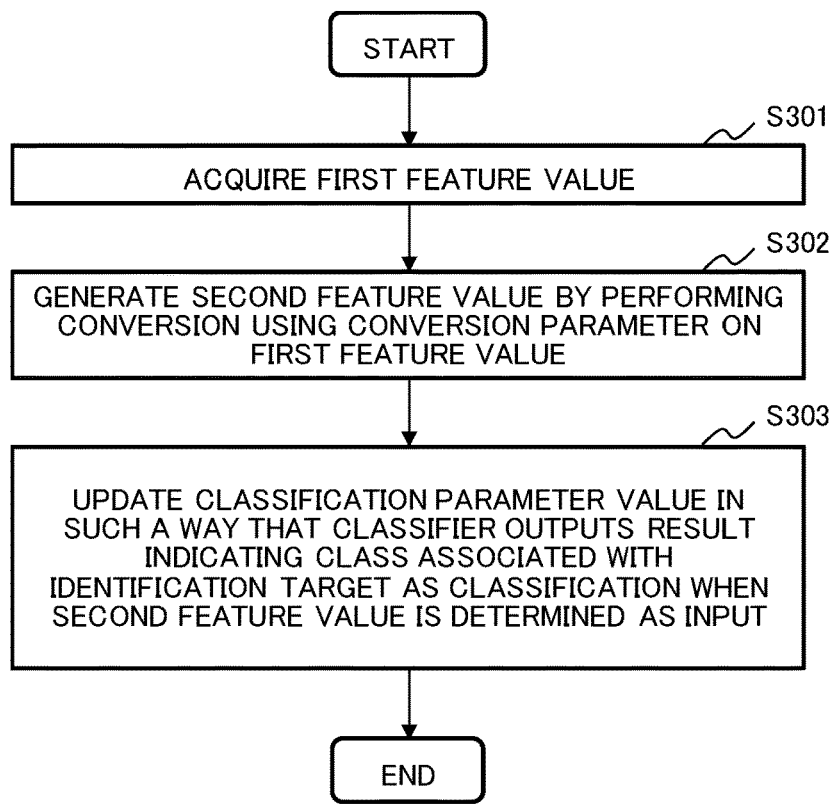
FIG. 10 is a block diagram illustrating a processing flow of a learning method by the learning device according to the one example embodiment of the present invention.

Referring to a flowchart in FIG. 10, an example of a processing flow by the learning device 30 will be described. First, the data acquisition unit 301 acquires a first feature value (Step S301). Next, the conversion unit 303 generates a second feature value by performing a conversion using a conversion parameter on the first feature value (Step S302). Then, the parameter updating unit 305 updates classification parameter values in such a way that the classifier outputs a result indicating a class associated with an identification target as a classification when the second feature value is determined as an input (Step S303).

The learning device 30 can generate an identifier capable of identifying a target in various forms even when the number of samples of data in which the target is recorded is small. The reason is that when a classifier uses updated classification parameter values, data in which an identification target is recorded that may be represented by a second feature value are classified correctly (in other words, as a class associated with the identification target) even when the data are not used in learning.

Hardware Configuration Providing Each Unit According to Example Embodiments

A block indicating each component in each device according to each example embodiment of the present invention described above is described on a functional basis. However, a block indicating a component does not necessarily mean that each component is configured with a separate module.

For example, processing by each component may be provided by a computer system reading and executing a program causing the computer system to execute the processing, the program being stored by a computer-readable storage medium. For example, a "computer-readable storage medium" includes a portable medium such as an optical disk, a magnetic disk, a magneto-optical disk, and a nonvolatile semiconductor memory, and a storage device such as a read only memory (ROM) built into the computer system and a hard disk. A "computer-readable storage medium" also includes a medium capable of transitorily holding the program such as a volatile memory inside the computer system and a medium transmitting the program, such as a network and a communication line such as a telephone line. The aforementioned program may be a program for providing part of the aforementioned functions and may further be a program capable of providing the aforementioned functions in combination with a program already stored in the computer system.

Figure 11:
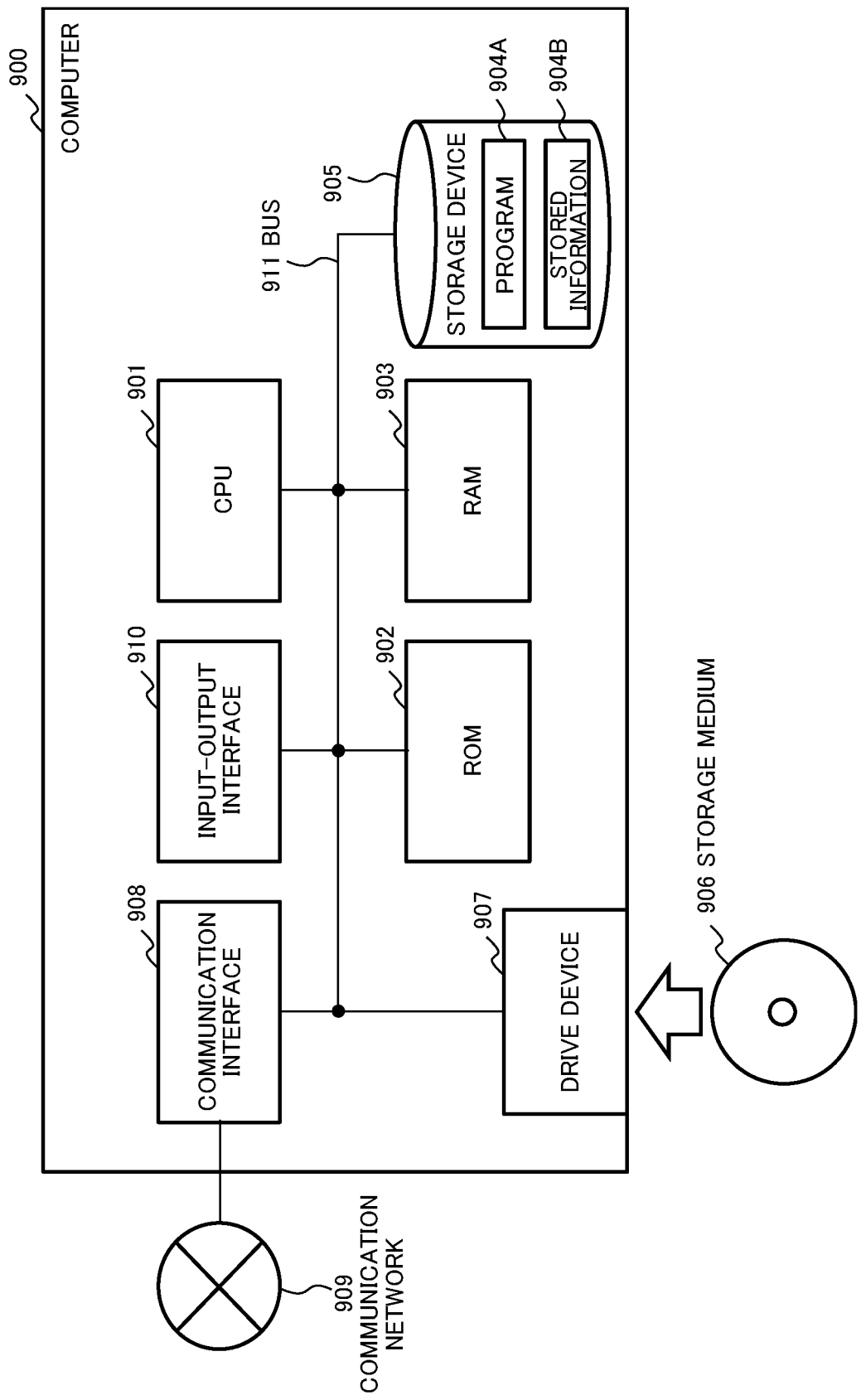
FIG. 11 is a block diagram illustrating an example of hardware constituting each unit according to each example embodiment of the present invention.

As an example, a "computer system" is a system including a computer 900 as illustrated in FIG. 11. The computer 900 includes a configuration as follows.

One or a plurality of CPUs 901,
a ROM 902,
a random access memory (RAM) 903,
a program 904A loaded into the RAM 903, and stored information 904B,
a storage device 905 storing the program 904A and the stored information 904B,
a drive device 907 performing reading and writing from and into a storage medium 906,
a communication interface 908 connected to a communication network 909,
an input-output interface 910 performing input and output of data, and
a bus 911 connecting the components.

For example, each component in each device according to each example embodiment is provided by the CPU 901 loading the program 904A providing the function of the component into the RAM 903 and executing the program. For example, the program 904A providing the function of each component in each device is previously stored in the storage device 905 and/or the ROM 902. Then, the CPU 901 reads the program 904A as needed. For example, the storage device 905 is a hard disk. The program 904A may be supplied to the CPU 901 through the communication network 909, or may be previously stored in the storage medium 906, be read into the drive device 907, and be supplied to the CPU 901. For example, the storage medium 906 is a portable medium such as an optical disk, a magnetic disk, a magneto-optical disk, and a nonvolatile semiconductor memory.

There are various modified examples of a method of providing each device. For example, each device may be provided by a separate, practicable combination of a computer 900 and a program for each component. A plurality of components included in each device may be provided by one practicable combination of a computer 900 and a program.

A part or the whole of each component of each device may be provided by another general-purpose or dedicated circuit, computer, and/or the like, or a combination thereof. The above may be configured with a single chip or a plurality of chips connected through a bus.

When a part or the whole of each component in each device is provided by a plurality of computers, circuits, and/or the like, the plurality of computers, circuits, and/or the like may be placed in a concentrated manner or in a distributed manner. For example, each of the computers, circuits, and/or the like may be provided in a form of being connected through a communication network, such as a client-server system or a cloud computing system.

A part or the whole of the aforementioned example embodiments may also be described as the following Supplementary Notes but are not limited thereto.

Supplementary Notes

Supplementary Note 1

A learning device comprising:
an acquisition means for acquiring a first feature value derived, by an encoder, from data in which an identification target is recorded, the encoder being configured to derive interconvertible feature values from data in which different forms of a same target are respectively recorded, by a conversion using a conversion parameter taking a value based on a difference between the forms;

a conversion means for generating a second feature value by performing a conversion using a value of the conversion parameter on the first feature value; and a parameter updating means for updating a value of a classification parameter used in classification by a classification means configured to perform classification with a feature value as an input, in such a way that the classification means outputs a result indicating a class associated with the identification target as a classification when the second feature value is determined as an input.

Supplementary Note 2

The learning device according to Supplementary Note 1, wherein the conversion means generates a plurality of second feature values from the first feature value by a plurality of conversions respectively using values of the conversion parameters different from each other, and the parameter updating means updates a value of the classification parameter in such a way that the classification means outputs a result indicating a class associated with the identification target as a classification when any of the plurality of second feature values is determined as an input.

Supplementary Note 3

The learning device according to Supplementary Note 1 or 2, wherein the conversion means performs the conversion changing an arrangement of a component of the first feature value.

Supplementary Note 4

The learning device according to any one of Supplementary Notes 1 to 3, wherein the data represent an image, and the identification target is an object or a person.

Supplementary Note 5

The learning device according to any one of Supplementary Notes 1 to 3, wherein the data represent an image generated from sensing data by a synthetic aperture radar (SAR), and a difference between the forms is a difference resulting from a condition when sensing is performed by a SAR.

Supplementary Note 6

The learning device according to any one of Supplementary Notes 1 to 5, further comprising:

the classification means for performing classification with the second feature value as an input.

Supplementary Note 7

The learning device according to any one of Supplementary Notes 1 to 6, further comprising:

the encoder.

Supplementary Note 8

A classification method comprising:

performing classification by the classification means using a value of the classification parameter updated by the learning device according to any one of Supplementary Notes 1 to 6, with a third feature value as an input, the third feature value being derived from new data by use of the encoder.

Supplementary Note 9

A learning method comprising:

acquiring a first feature value derived, by an encoder, from data in which an identification target is recorded, the encoder being configured to derive interconvertible feature values from data in which different forms of a same target are respectively recorded, by a conversion using a conversion parameter taking a value based on a difference between the forms;

generating a second feature value by performing a conversion using a value of the conversion parameter on the first feature value; and updating a value of a classification parameter used in classification by a classification means configured to perform classification with a feature value as an input, in such a way that the classification means outputs a result indicating a class associated with the identification target as a classification when the second feature value is determined as an input.

Supplementary Note 10

The learning method according to Supplementary Note 9, further comprising:

generating a plurality of second feature values from the first feature value by a plurality of conversions respectively using values of the conversion parameters different from each other; and updating a value of the classification parameter in such a way that the classification means outputs a result indicating a class associated with the identification target as a classification when any of the plurality of second feature values is determined as an input.

Supplementary Note 11

The learning method according to Supplementary Note 9 or 10, further comprising:

performing the conversion changing an arrangement of a component of the first feature value.

Supplementary Note 12

The learning method according to any one of Supplementary Notes 9 to 11, wherein the data represent an image, and the identification target is an object or a person.

Supplementary Note 13

The learning method according to any one of Supplementary Notes 9 to 11, wherein the data represent an image generated from sensing data by a synthetic aperture radar (SAR), and a difference between the forms is a difference resulting from a condition when sensing is performed by a SAR.

Supplementary Note 14

A classification method comprising:

performing classification by the classification means using a value of the classification parameter updated by the learning method according to any one of Supplementary Notes 9 to 13, with a third feature value as an input, the third feature value being derived from new data by use of the encoder.

Supplementary Note 15

A computer-readable storage medium having a program stored thereon, the program causing a computer to execute:

acquisition processing of acquiring a first feature value derived, by an encoder, from data in which an identification target is recorded, the encoder being configured to derive interconvertible feature values from data in which different forms of a same target are respectively recorded, by a conversion using a conversion parameter taking a value based on a difference between the forms;

conversion processing of generating a second feature value by performing a conversion using a value of the conversion parameter on the first feature value; and parameter updating processing of updating a value of a classification parameter used in classification by a classification means configured to perform classification with a feature value as an input, in such a way that the classification means outputs a result indicating a class associated with the identification target as a classification when the second feature value is determined as an input.

Supplementary Note 16

The storage medium according to Supplementary Note 15, wherein the conversion processing generates a plurality of second feature values from the first feature value by a plurality of conversions respectively using values of the conversion parameters different from each other, and the parameter updating processing updates a value of the classification parameter in such a way that the classification means outputs a result indicating a class associated with the identification target as a classification when any of the plurality of second feature values is determined as an input.

Supplementary Note 17

The storage medium according to Supplementary Note 15 or 16, wherein the conversion processing performs the conversion changing an arrangement of a component of the first feature value.

Supplementary Note 18

The storage medium according to any one of Supplementary Notes 15 to 17, wherein the data represent an image, and the identification target is an object or a person.

Supplementary Note 19

The storage medium according to any one of Supplementary Notes 15 to 17, wherein the data represent an image generated from sensing data by a synthetic aperture radar (SAR), and a difference between the forms is a difference resulting from a condition when sensing is performed by a SAR.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 13, 30-32 Learning device
110 Variable derivation unit
111 Data acquisition unit
112 Encoder
113 Conversion unit
114 Decoder
115 Parameter updating unit
118 Latent variable storage unit
119 Parameter storage unit
310 Classification learning unit
301, 311 Data acquisition unit
312 Encoder
303, 313 Conversion unit
305, 315 Parameter updating unit
316 Output unit
317 Classification unit
900 Computer
901 CPU
902 ROM
903 RAM
904A Program
904B Stored information
905 Storage device
906 Storage medium
907 Drive device
908 Communication interface
909 Communication network
910 Input-output interface
911 Bus

The invention claimed is:

1. A learning device comprising:
at least one memory storing instructions; and
at least one processor configured to access the at least one memory and execute the instructions to:
acquire a first feature value derived, by an encoder, from data in which an identification target is recorded, the encoder being configured to derive interconvertible feature values from data in which different forms of a same target are respectively recorded, by a conversion using a conversion parameter taking a value based on a difference between the forms;
generate a second feature value by performing a conversion using a value of the conversion parameter on the first feature value; and
update a value of a classification parameter used in classification with the second feature value as an input, in such a way that a result indicating a class associated with the identification target is output in the classification.

2. The learning device according to claim 1, wherein the at least one processor is further configured to execute the instructions to:
generate a plurality of second feature values from the first feature value by a plurality of conversions respectively using values of the conversion parameters different from each other, and
update a value of the classification parameter in such a way that a result indicating a class associated with the identification target as a classification is output when any of the plurality of second feature values is determined as an input.

3. The learning device according to claim 1, wherein the at least one processor is further configured to execute the instructions to:
the conversion means performs the conversion changing an arrangement of a component of the first feature value.

4. The learning device according to claim 1, wherein the data represent an image, and the identification target is an object or a person.

5. The learning device according to claim 1, wherein the data represent an image generated from sensing data by a synthetic aperture radar (SAR), and a difference between the forms is a difference resulting from a condition when sensing is performed by a SAR.

6. The learning device according to claim 1, wherein the classification means for performing classification with the second feature value as an input.

7. The learning device according to claim 1, further comprising:
the encoder.

8. A learning method comprising:
acquiring a first feature value derived, by an encoder, from data in which an identification target is recorded, the encoder being configured to derive interconvertible feature values from data in which different forms of a same target are respectively recorded, by a conversion using a conversion parameter taking a value based on a difference between the forms;
generating a second feature value by performing a conversion using a value of the conversion parameter on the first feature value; and
updating a value of a classification parameter used in classification with the second feature value as an input, in such a way that a result indicating a class associated with the identification target as a classification is output.

9. The learning method according to claim 8, further comprising:
generating a plurality of second feature values from the first feature value by a plurality of conversions respectively using values of the conversion parameters different from each other; and
updating a value of the classification parameter in such a way that a result indicating a class associated with the identification target as a classification is output when any of the plurality of second feature values is determined as an input.

10. The learning method according to claim 8, further comprising:
performing the conversion changing an arrangement of a component of the first feature value.

11. The learning method according to claim 8, wherein the data represent an image, and the identification target is an object or a person.

12. The learning method according to claim 8, wherein the data represent an image generated from sensing data by a synthetic aperture radar (SAR), and a difference between the forms is a difference resulting from a condition when sensing is performed by a SAR.

13. A non-transitory computer-readable storage medium having a program stored thereon, the program causing a computer to execute:
acquisition processing of acquiring a first feature value derived, by an encoder, from data in which an identification target is recorded, the encoder being configured to derive interconvertible feature values from data in which different forms of a same target are respectively recorded, by a conversion using a conversion parameter taking a value based on a difference between the forms;
conversion processing of generating a second feature value by performing a conversion using a value of the conversion parameter on the first feature value; and
parameter updating processing of updating a value of a classification parameter used in classification with the second feature value as an input, in such a way that a result indicating a class associated with the identification target as a classification is output.

14. The storage medium according to claim 13, wherein the conversion processing generates a plurality of second feature values from the first feature value by a plurality of conversions respectively using values of the conversion parameters different from each other, and
the parameter updating processing updates a value of the classification parameter in such a way that a result indicating a class associated with the identification target as a classification is output when any of the plurality of second feature values is determined as an input.

15. The storage medium according to claim 13, wherein the conversion processing performs the conversion changing an arrangement of a component of the first feature value.

16. The storage medium according to claim 13, wherein the data represent an image, and the identification target is an object or a person.

17. The storage medium according to claim 13, wherein the data represent an image generated from sensing data by a synthetic aperture radar (SAR), and a difference between the forms is a difference resulting from a condition when sensing is performed by a SAR.

* * * * *